No. 811,555.

PATENTED FEB. 6, 1906.

W. S. FREEL.
FISHING DEVICE.
APPLICATION FILED AUG. 19, 1905.

Witnesses

Inventor
Wm. S. Freel.
By — Attorneys

UNITED STATES PATENT OFFICE.

WILLIAM S. FREEL, OF BAY CITY, MICHIGAN.

FISHING DEVICE.

No. 811,555.  Specification of Letters Patent.  Patented Feb. 6, 1906.

Application filed August 19, 1905. Serial No. 274,884.

*To all whom it may concern:*

Be it known that I, WILLIAM S. FREEL, a citizen of the United States, residing at Bay City, in the county of Bay and State of Michigan, have invented certain new and useful Improvements in Fishing Devices, of which the following is a specification.

This invention embodies improved means for catching fish; and it consists, primarily, of a trap adapted to be attached to a fishing-line and comprising an arrangement of hooks and actuating means therefor designed to facilitate entrapping fish.

For a full description of the invention and the merits thereof and also to acquire a knowledge of the details of construction of the means for effecting the result reference is to be had to the following description and accompanying drawings, in which—

Figure 1:
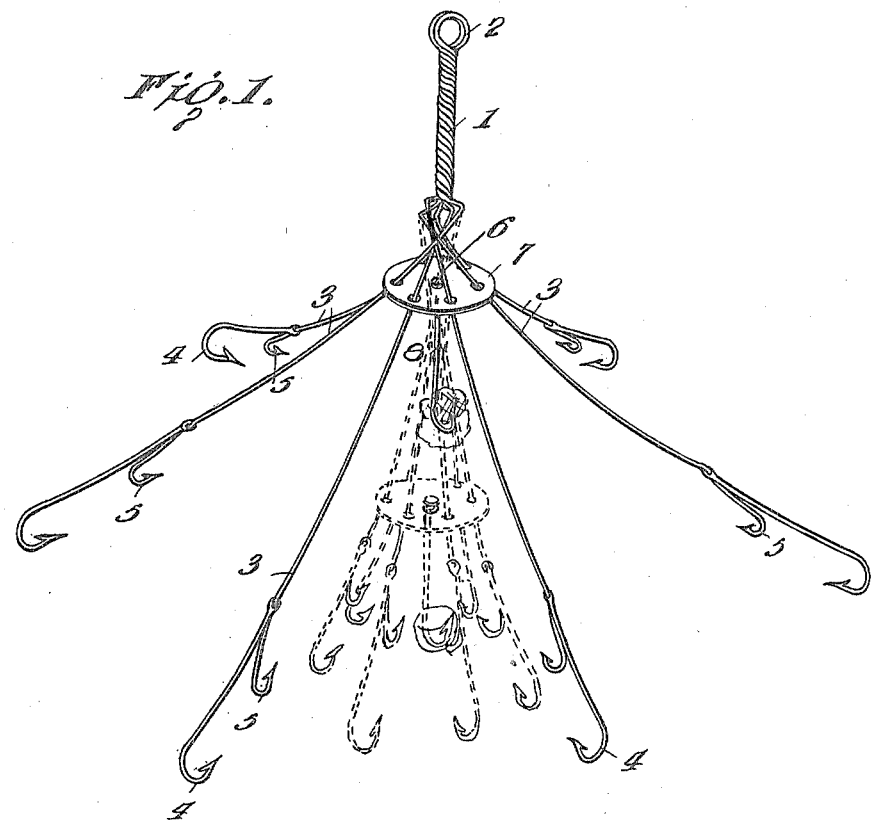
Figure 2:
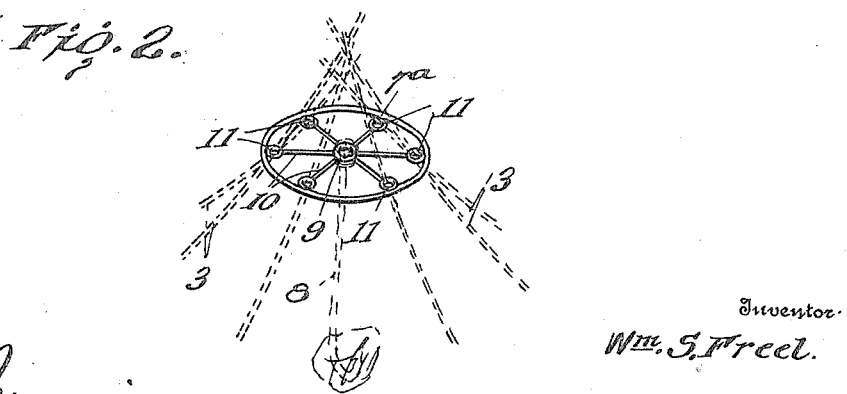

Figure 1 is a perspective view showing the device embodying the invention, dotted lines showing the hooks in the positions assumed thereby when the shanks are forced together. Fig. 2 is a view embodying a modification of the invention.

Corresponding and like parts are referred to in the following description and indicated in both the views of the drawings by the same reference characters.

Referring to the drawings, the numeral 1 designates a main shank, at one extremity of which is formed a suitable eye or loop 2, by which the device may be attached to a suitable line, whereby it may be raised or lowered in the water. The main shank 1 is preferably formed by intertwisted portions of a plurality of diverging shanks 3, which carry a plurality of hooks 4 and 5. The hooks 4 are at the lower extremities of the shanks 3, while the hooks 5 are arranged at a point intermediate the ends of said shanks, each shank being preferably provided with a pair of hooks, though more or less may be used, as is deemed necessary. The several hooks 4 and 5 of the shanks 3 face inwardly or project into the space which is formed between the diverging shanks, and the several shanks 3 cross each other at angles, as shown at 6, and being made of spring-wire or the like they have a spring action thereto, which normally tends to separate the same, as shown in full lines in Fig. 1. In other words, the various shanks 3 are normally in divergent positions, extending from the shank 1, special means being provided for forcing the shanks 3 toward each other to cause similar movement of the several hooks 4 and 5. For the above purpose an actuating member 7 is mounted on the shanks 3 adjacent the crossed portions 6 thereof, said actuating member being slidable longitudinally of the shanks, so that movement of the actuating member toward the hooks 5 will force the hooks 4 and 5 together and cause the latter to engage with a fish or similar aquatic animal which may have previously been enticed into the space between the shanks 3.

In the form of the invention shown in Fig. 1 the actuating member 7 comprises a plate, preferably of circular formation, though not necessarily so, and said plate forms a hydroplane supported by the shanks 3 and the hooks adapted to cause a resistance to the movement of the device in the water when the same is pulled upwardly by means of the line attached thereto. A bait-hook 8 is carried by the hydroplane or actuating member 7, and said hook 8 is preferably swiveled at its upper end to the central portion of the member 7. The member 7, as shown in Fig. 1, is provided with a plurality of openings having a circular arrangement, through which openings the several shanks 3 pass just below the interlaced portions 6 thereof.

In the operation of the invention in the construction shown in Fig. 1, the bait-hook 8 having been baited and the device lowered into the water, it will readily be seen that the fish biting on the hook 8 will be enticed into the space between the several hooks 4 and 5 and the shanks carrying the same. As soon as the fisherman feels a bite on the line a sudden jerk will pull the trap device upwardly in the water, and as the member 7 is a hydroplane resisting movement of the trap through the water the pressure against the upper side of the member 7 will force the same downward longitudinally of the shanks 3, causing the shanks to be forced together and effecting an engagement of the hooks 4 or 5 with the body of the animal therebetween. The hooks 5 are smaller hooks and are utilized, preferably, for insuring the catching of small fish which might pass through the space between the shanks 3 were the larger hooks 4 only used. It is preferable that each of the hooks 5 be somewhat shorter than its adjacent hook 4, so as to prevent entangling of the shanks at the lower ends. It will further be noted that when the device is permitted to suddenly move downwardly in the water after having been pulled upwardly the pressure of the water against the under side of the member 7 will actuate the latter in an upward direction and cause the hooks 4 and 5 to separate or move apart in an obvious manner. It will be also seen that a fish caught by the hook 8 and attempting to get away will pull on the hook 8, thereby actuating the member 7 and causing the several hooks 4 and 5 to close about its body. The action of the member 7 is thus positive.

Fig. 2 illustrates a modification of the invention in which the same is particularly designed for trolling, and in this instance it is undesirable that a hydroplane should be used as the actuating member for the shank 3, and, in fact, such a member would not be operative for the purpose, since a constant pressure would be caused thereon by the movement of the trap or device through the water. Thus in the construction shown in Fig. 2 the actuating member 7ª comprises a circular frame, which may be of wire, and a small ring 9 at the center of the frame is connected therewith by means of diverging wires 10 or the like. The bait-hook 8 may have swivel connection with the ring 9, and each of the wires 10 is formed with an eye 11 near its upper end to receive the shanks 3, carrying the several pairs of hooks 4 and 5. The actuating member 7ª being connected with the bait-hook 8 will be operated by the fish when caught upon said hook, said fish pulling the member 7ª downwardly on the shanks 3 and forcing the several hooks 4 and 5 together.

Having thus described the invention, what is claimed as new is—

1. In a device of the class described, the combination of a plurality of normally spaced apart hooks, bait-supporting means between said hooks, and a hydroplane arranged to force the hooks together when the device is pulled through water.

2. In a device of the class described, the combination of a plurality of spring-shanks normally spaced apart, hooks carried by said shanks, bait-supporting means between said hooks, and a hydroplane movable relatively to the shanks and arranged to force the same together as the device is given a sharp jerk when in water.

3. In a fish-trap, the combination of a plurality of spring-shanks normally arranged in diverging positions, an actuating member connected with the shanks to force the same together, hooks carried by the shanks, and a bait-hook connected with the actuating member and normally arranged in the space about which the several shanks are arranged.

4. In a fish-trap, the combination of a main shank, a plurality of shanks diverging from the main shank, and normally spaced apart by spring action, hooks carried by the diverging shanks, bait-supporting means arranged in the space about which the diverging shanks are disposed, and an actuating member supported by the diverging shanks and adapted by movement thereon to force the same together.

5. In a fish-trap, the combination of a plurality of shanks intertwisted at one end to form a main shank provided with an eye for attachment to the line, the plurality of shanks normally retaining divergent positions by spring action, and a plurality of hooks carried by the several shanks projected from the main shank, an actuating member slidable longitudinally on the plurality of divergent shanks, and a bait-hook connected with said actuating member.

6. In a device of the class described, the combination of a plurality of normally spaced apart hooks, and a hydroplane operably connected with said hooks to force the same together when the device is pulled sharply through water.

In testimony whereof I affix my signature in presence of two witnesses.

WILLIAM S. FREEL. [L. S.]

Witnesses:
 WM. S. WILKIN,
 FRED EBERHARDT.